(No Model.)

G. E. MERTZ.
LATHE.

No. 402,958. Patented May 7, 1889.

WITNESSES.
G. Milton Cady
Henry J. Stapelton

INVENTOR.
George E. Mertz,
by Edson Salisbury Jones
Attorney.

N. PETERS. Photo-Lithographer, Washington, D. C.

UNITED STATES PATENT OFFICE.

GEORGE EMIL MERTZ, OF PORT CHESTER, NEW YORK.

LATHE.

SPECIFICATION forming part of Letters Patent No. 402,958, dated May 7, 1889.

Application filed August 30, 1888. Serial No. 284,157. (No model.)

*To all whom it may concern:*

Be it known that I, GEORGE EMIL MERTZ, of Port Chester, in the county of Westchester and State of New York, have invented a new and useful Improvement in Lathes; and I do hereby declare the following specification, taken in connection with the accompanying drawings, forming a part of the same, to be a description thereof.

This invention relates to a lathe which is particularly adapted to the turning of wood moldings, the pattern or design of which is composed of similar repeated sections, although the lathe is adapted to turn other articles as well. The invention consists in certain features of construction and arrangement, hereinafter described and claimed.

Figure 1:
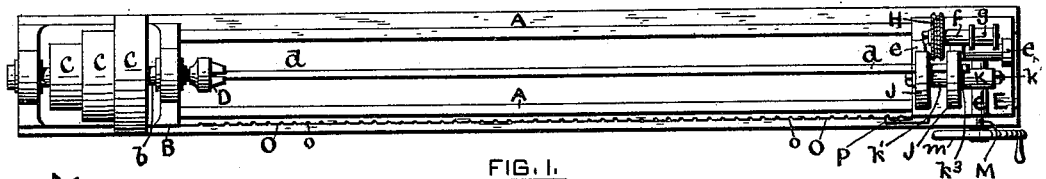
Figure 2:
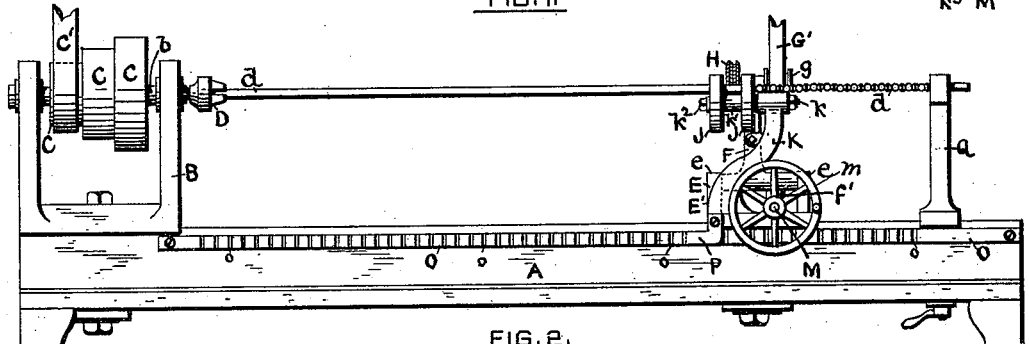
Figure 3:
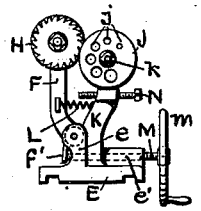
Figure 4:
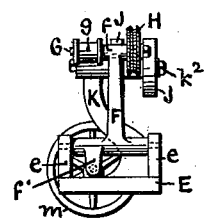
Figure 6:
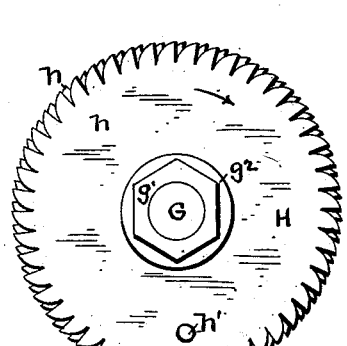
Figure 5:
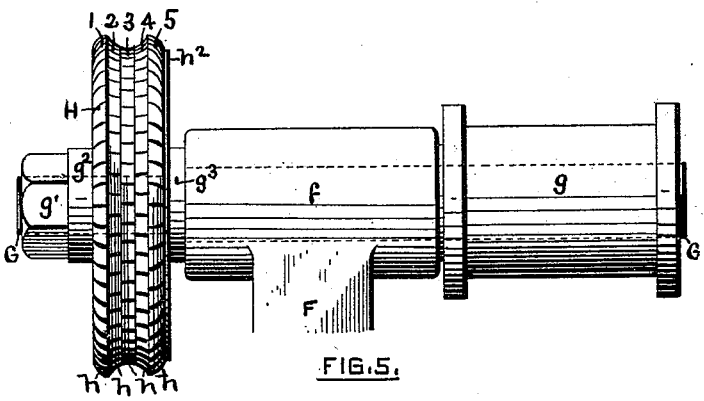
Figure 7:
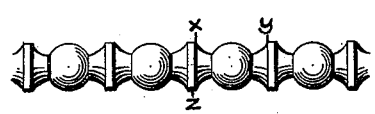
Figure 8:
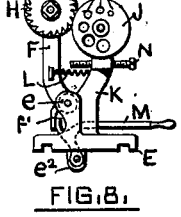

Referring to the drawings, Figure 1 represents a top view of a lathe embodying the invention. Fig. 2 shows a face view of the same. Figs. 3 and 4 represent, respectively, an end view and a rear view of the movable head and the parts mounted thereon. Fig. 5 shows, on an enlarged scale, a face view of the turning-tool or cutter and the arm upon which it is mounted. Fig. 6 represents an end view of the same. Fig. 7 shows a piece of molding produced by such cutter or tool. Fig. 8 represents an end view of the movable head and the parts mounted thereon, another form of lever for bringing the tool up to its work being shown.

A is the bed of the lathe.

B is the stationary head secured thereto, and furnished with a spindle, $b$, upon which are mounted a pulley or pulleys, C, for driving the spindle. The forward end of the spindle is furnished with a chuck or device, D, for holding the stick of wood $d$ to be turned, and causing it to rotate.

E is the movable head. Upon this head an arm, F, is pivoted to two studs, $e$ $e$, Fig. 4, and upon the upper end of the arm is a bearing, $f$, through which passes a spindle, G, Fig. 5, having a pulley, $g$, thereon for rotating the same.

H is the rotary tool or cutter, which is secured to the spindle G in any preferred manner, as by a nut, $g'$, and washer $g^2$, which clamp the tool against a collar, $g^3$, on the spindle, as shown in Fig. 5.

The tool H may be composed of a single piece of metal, but is preferably composed of several metal disks, $h$, having central holes to fit the spindle G, the periphery of each of which disks is notched or serrated in such a manner as to make it a cutter, and said disks are placed side by side or made into a "gang," and may have a screw or pin, $h'$, Fig. 6, passing through the same, if desired, further to guard against their turning with relation to each other. The disks $h$ composing the tool or cutter H vary in diameter and in the transverse contour of their perimeters. If, for instance, the molding shown in Fig. 7 is to be turned, the disks 1 and 5, Fig. 5, will have the greatest diameter, the disk 3 will have the least diameter, and the transverse contour of disks 1 and 5 will be convex and that of the disks 2, 3, and 4 concave.

In order to steady and support the stick $d$ while it is being turned, a plate or plates, J, are mounted upon an arm, K, which projects upwardly from the head E. As shown in the drawings, these plates are placed upon a spindle, $k$, secured to said arm, a washer, $k'$, is placed between them, and a nut, $k^2$, clamps them on the spindle against a collar, $k^3$, thereon, as shown in Fig. 1. A single plate J may be used; but I prefer to employ two plates, located one on each side of the tool H, as shown in Figs. 1 and 2. These plates are each furnished with a hole, $j$, slightly larger than the stick to be turned, and, preferably, a series of such holes of different sizes are made in each plate, so that sticks of different diameters may be supported by turning the plates into such positions that the proper holes will be in alignment with the axis of the stick.

The cutting-tool H is normally located out of engagement with the stick, and may be held there by gravity, by a weight, or by a spring, L, Fig. 3, which forces the tool backward. The tool may be brought up to its work by any form of lever—as a screw, M, Figs. 1, 2, and 3—which is threaded through a boss, $e'$, on the head E, bears against a tang, $f'$, on the arm F at one end, and has a hand-wheel, $m$, at the other end; or a lever, M, Fig. 8, may be used, which is pivoted to a stud, $e^2$, depending from the head E, and has one of its ends arranged to engage the tang $f'$.

The operation of the lathe is substantially as follows: The movable head E is first slid to the right-hand end of the bed A. One end of the stick *d* is then secured to the spindle *b* by means of the chuck D. The plates J having been turned so that the proper sized holes are in alignment with the axis of the stick, the head E is moved toward the left hand until the stick enters said holes. The lathe is then started, the pulley or pulleys C being driven by a belt, C', from a counter-shaft, and the pulley *g* by a belt, G', from a counter-shaft in the form of a roller, which will allow the belt to travel thereon in a perfectly well-understood way. By means of the screw or lever M the rotary tool H is moved toward the stick until it has cut or turned thereon the desired section of molding, which in the design or pattern shown in Fig. 7 will be from *x* to *y*. The cutter H is then allowed to return to normal position. Any desired form of stop may be used to limit the inward or forward movement of the tool H, as a circular flange, $h^2$, Fig. 5, upon one or both of the disk-cutters 1 5, or an adjustable screw, N, passing through the arm K, so that the arm F can abut against it, as shown in Fig. 3.

One section of the molding having been cut or turned, as described, the head E is then moved toward the left hand the necessary distance to leave the amount of unturned stock desired between the section of pattern already turned and the next succeeding section, which in the design of molding shown will be the plain surface *z*, and the tool H is again brought up to turn said second section. By a repetition of these movements substantially the whole length of the stick can be turned or molded.

In order accurately to gage the position of the head E on the bed A so that the repeated sections of the pattern of molding shall bear the proper relation to each other in position, the bed may be furnished with a scale, O, Figs. 1 and 2, which may be a strip of metal secured to the bed and provided with marks *o*, up to which the front edge, E', of the head E is to be brought for each section of the pattern, and the marks *o* may be V shape or concave indentations, and a spring catch or latch, P, attached to the head E, may be employed to enter said indentations, so that the proper position of the head can be determined with less care on the part of the operator.

After a portion of the stick *d* has been turned or molded a rest, Q, Fig. 2, having a a hole of the proper diameter therein, may be mounted upon the bed, so as to support the free end of the stick.

When sticks of, say, an inch or more in diameter are to be turned, in place of securing a chuck, D, to the spindle *b* the ordinary and well-known center for the head-stock of a wood-turning lathe may be used, such center having a central point and sharpened radial ribs extending therefrom adapted to enter the end of the stick. For such sticks, also, the ordinary and well-known tail-stock having a movable conical-ended center or spindle may be used to support the opposite end of the stick.

What I claim, and desire to secure by Letters Patent, is—

1. The combination, with the lathe-bed, a stationary head mounted thereon and having a spindle provided with a chuck or device for holding a stick to be turned, of a movable head having an arm pivoted thereon to swing transversely of the lathe, a rotary tool or cutter mounted on said arm, a lever for bringing the tool or cutter up to its work, and a support for the stick, substantially as set forth.

2. The combination, with the lathe-bed, a stationary head mounted thereon and having a spindle provided with a chuck or device for holding a stick to be turned, of a movable head having an arm pivoted thereon to swing transversely of the lathe, a rotary tool or cutter mounted on said arm, a lever for bringing the cutter up to its work, means, substantially as described, for returning the cutter to normal position, and a support for the stick, substantially as set forth.

3. The combination, with the lathe-bed, a stationary head mounted thereon and having a spindle provided with a chuck or device for holding a stick to be turned, of a movable head having an arm pivoted thereon to swing transversely of the lathe, a rotary tool or cutter mounted on said arm and composed of two or more disks having notched or serrated peripheries, a lever for bringing the tool or cutter up to its work, means for returning the cutter to normal position, and a support for the stick, substantially as set forth.

4. The combination, with the lathe-bed, a stationary head mounted thereon and having a spindle provided with a chuck or device for holding a stick to be turned, of a movable head having an arm pivoted thereon to swing transversely of the lathe, a rotary tool or cutter mounted on said arm, a lever for bringing the tool or cutter up to its work, means for returning the cutter to normal position, a support for the stick, and a scale upon the lathe-bed for determining or gaging the positions of the movable head on the bed from time to time for the proper spacing of the pattern being turned, substantially as set forth.

5. The combination, with the lathe-bed, a stationary head mounted thereon and having a spindle provided with a chuck or device for holding a stick to be turned, of a movable head having an arm pivoted thereon to swing transversely of the lathe, a rotary tool or cutter mounted on said arm, a lever for bringing the tool or cutter up to its work, means for returning the cutter to normal position, a support for the stick, a scale upon the lathe-bed, and a spring catch or latch upon the movable head for engaging the scale and gaging the proper position of the movable head on the bed, substantially as set forth.

6. The combination, with the movable head, of an arm, F, pivoted thereon to swing transversely of the head, a rotary cutter mounted on said arm, an arm, K, fixed to the head and having a plate or plates for supporting the stick to be turned, and a lever for bringing the cutter up to its work, substantially as set forth.

7. The combination, with the movable head, of an arm, F, pivoted thereon, a rotary cutter mounted on said arm, an arm, K, fixed to the head and having an adjustable plate or plates provided with holes of different diameters for supporting sticks of different sizes, and a lever for bringing the cutter up to its work, substantially as set forth.

GEORGE EMIL MERTZ.

Witnesses:
GEORGE GERLACH,
EDSON SALISBURY JONES.